Sept. 13, 1955 L. H. FLORA 2,717,622
RETAINER FOR SECURING THREADED MEMBER IN A SLOT
Filed Sept. 16, 1952
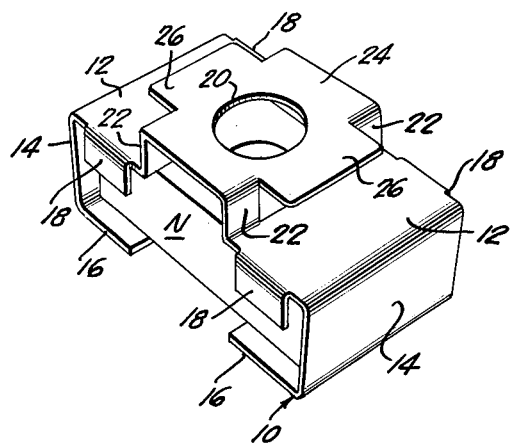
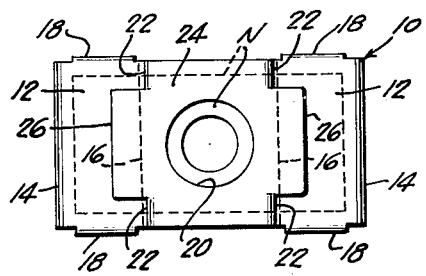
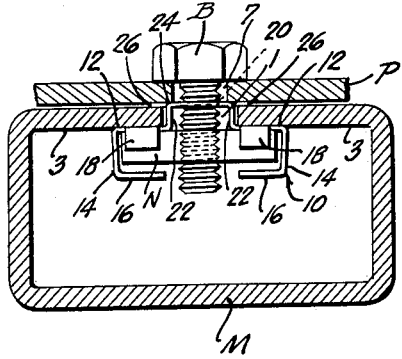
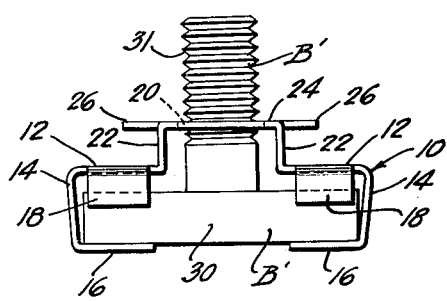
INVENTOR
LAURENCE H. FLORA
BY
ATTORNEY

United States Patent Office 2,717,622
Patented Sept. 13, 1955

2,717,622

RETAINER FOR SECURING THREADED MEMBER IN A SLOT

Laurence H. Flora, Cleveland, Ohio, assignor to Tinnerman Products, Inc., Cleveland, Ohio, a corporation of Ohio Application September 16, 1952, Serial No. 309,900

2 Claims. (Cl. 151—41.7)

This invention relates in general to nut and bolt fastened installations and deals, more particularly, with improvements in fastening devices for retaining or holding conventional nuts and bolts in fastening position in an assembly prior to the application of the cooperating fastening devices thereto for securing the parts of the assembly.

The invention has special application in the attachment of nuts and bolts in fastening position in concealed or blind locations where the nut or bolt is not conveniently or readily accessible for holding the same in fastening position prior to and during the application of the cooperating fastener thereto. The present invention is particularly useful for the attachment of nuts and bolts to enclosed members to be secured such as channel shaped structural parts, moldings, and the like, which are usually fabricated with an elongate slot or readily provided with such a slot, and the fastening device of the invention easily attached in such a slot to retain a nut or bolt head at the interior of the molding or channel shape in position for the application of the cooperating fastening device thereto to secure the molding or channel shape in an installation.

A primary object of the invention is to provide an improved form of holder or retainer for a nut, bolt or other clamping member which includes in its construction a simplified attaching means which is readily assembled in a slot in a molding or channel shape, or the like, to provide a positive, nonrotatable attachment of the nut or bolt in fastening position at the interior of the molding or channel shape.

A further object of the invention is to provide such a holder or retainer having an attaching means comprising a special abutment construction formed as an integral part of the base thereof and which is adapted to seat in the slot in the channel shape or molding to prevent relative rotation of the holder and the nut or bolt carried thereby.

A further object of the invention is to provide a holder for a nut or bolt, as aforesaid, which is especially suited for heavy duty applications requiring a bolt or nut having a relatively wide clamping surface for providing a strong stable structure adapted to support heavy loads.

Another object of the invention is to provide a holder of the kind described which provides for shifting or adjustment of the attached nut or bolt as necessary to compensate for misalignment in the bolt passages in the parts secured.

Further objects and advantages, and other new and useful features in the construction, arrangement and general combination of elements of the invention will be readily apparent as the following description proceeds with reference to the accompanying drawings, for purposes of illustration but not of limitation, in which like reference characters designate like parts throughout, and in which:

Fig. 1 is a perspective view of a combined nut and nut holder in accordance with the invention;

Fig. 2 is a top plan view of the fastening device seen in Fig. 1; and,

Fig. 3 is a sectional view, on a smaller scale, of an installation comprising a molding or channel shape, or the like, and shows in side elevation the nut holder of Figs. 1 and 2 as assembled in a slot in the molding or channel shape with the nut retained in fastening position at the interior of the molding or channel shape in position for the application of a cooperating bolt to the nut for securing the molding or channel shape with a plate, panel or other part.

Fig. 4 is a side elevational view of a bolt holder in accordance with the invention with the holder having a construction similar to that of Figs. 1 and 2 and adapted to be attached to a part to be secured in the same general manner shown in Fig. 3 in position for the application of a cooperating nut to the shank of the bolt.

Referring now, more particularly, to the drawings, Figs. 1 and 2 show a fastening device in accordance with the invention as provided for use as a holder or retainer 10 for a relatively large nut N or tapped plate, or the like. The holder 10 is constructed from a sheet metal section of a size and configuration determined by the shape and size of the nut with which it is to be used and may be readily designed for retaining any other suitable type of nut or equivalent clamping member such as the head of a bolt as shown in Fig. 4. In the present example, the holder 10 is shown as constructed for use with a relatively large generally rectangular threaded nut N or tapped plate. The holder is adapted to be attached in a slot in a molding or channel shape M, Fig. 3, to retain said nut N at the interior of said molding or channel shape M in position for the application of a cooperating bolt B to said nut N for securing said molding or channel shape M to a panel P, plate, or the like.

The arrangement is such that the molding or channel shape M is provided with a slot 1, Fig. 3, in which the nut holder is attached in a manner by which the nut holder 10 and the nut N retained thereby are positively held against relative rotation during the application and tightening of the cooperating bolt B applied to said nut N. In the present example, the molding M, Fig. 3, or other similar channel shaped structural part is shown as of conventional design terminating in inwardly extending flanges 3 the ends of which are spaced apart and thereby define the aforesaid slot 1 in which the nut holder is attached.

The holder 10 may be constructed of any suitable sheet metal but preferably that of a spring metal nature such as spring steel or cold rolled steel having spring like characteristics. The sheet metal blank forming the nut holder 10 is provided with a lengthwise base 12 having end portions thereof bent to define a pair of spaced arms 14 and inwardly bent flanges 16 conforming generally to the shape of the nut N but of larger size to provide for a floating mounting of said nut N within the holder. On opposite sides of the base 12 between the side arms 14, stop elements are provided in any suitable manner, as by spaced lugs 18 which retain the nut between said side arms 14 with the inturned flanges 16 overlying the outer surface or top of the nut N to enclose the same within the nut holder. The side arms 14 may be flexed apart as necessary to slip the nut N through the space between the ends of the inwardly bent flanges 16 to a position in which the holder retains the nut N in the manner of a cage device defined by the side arms 14, inturned flanges 16 and spaced lugs 18, as aforesaid. The nut N, as thus retained by the nut holder, has its threaded opening in line with an enlarged bolt passage 20 in the base 12 of the holder but capable of shifting or adjustment in any lateral direction between the side arms 14 and lugs 18 as necessary to compensate for misalignment and other irregularities in the bolt passages in the parts to be secured.

The attaching means for the fastening device 10 is provided by a continuous, outwardly bent central area of the base 12 including the enlarged bolt passage 20. This central area is provided in the form of an inverted generally U-shaped portion projecting outwardly out of the plane of said base 12 and comprises spaced side walls 22 on opposite sides of an intermediate bridge portion 24 provided with said enlarged bolt passage 20. The spaced side walls 22 of this inverted generally U-shaped projection have a predetermined spacing slightly less than the width of the slot 1 between the ends of the inturned flanges 3 of the molding M so that said side walls are readily receivable in said slot 1 and define spaced shoulders adapted for positive abutting relation with the adjacent sides of said slot 1.

The intermediate bridge portion 24 is formed to project outwardly out of the plane of the base portions 12 together with a pair of oppositely extending hooks or tongues 26 which are provided from partially severed portions of the side walls 22. The hooks 26 extend outwardly in opposite directions from opposite ends of the substantially flat bridge or bight portion 24 and substantially in the plane of said bight portion 24. The outwardly projecting hooks 26 are provided in a predetermined spacing from the base portions 12 approximating the thickness of the molding flanges 3 adjacent the slot 1 in the molding M so that said hooks 26 seat snugly against the outer surfaces of said molding flanges 3 with the base portions 12 bearing on the inner surfaces of said flanges 3 in the attached position of the nut holder substantially as shown in Fig. 3. The hooks 26 are resilient and preferably are formed for snug frictional engagement with the outer surfaces of said molding flanges 3 so that the nut holder is slidably adjustable in attached position in the slot 1 and is retained in any such attached position by said frictional engagement of said hooks 26 with said molding flanges 3.

The nut holder 10 thus provided is attached to the molding or channel shape M by inserting the same through a suitable opening or open end of the molding or channel shape in the relation shown in Fig. 3 with the base portions 12 bearing on the inner surfaces of the molding flanges 3, the side walls 22 extending through the slot 1 and the outwardly extending hooks 26 engaging the outer surfaces of said molding flanges 3. The nut holder 10 is then slid along the molding M to the desired position in registry with the associated bolt passage 7 in the panel or plate P. It will be understood that as many nut holders 10 as are necessary are assembled with the molding M or channel shape in this manner and the same adjusted to a spaced relation corresponding to the spacing of a series of bolt passages 7 provided in the panel or plate P along the path with which the molding or channel shape M extends in secured relation to said panel P. The molding or channel shape M having the said nut holders 10 thus attached thereto, is then readily secured with the plate or panel P by bolts B applied through the passages 7 into threaded engagement with the nuts N carried by the nut holders 10. In the application and tightening of the bolts B, it will be appreciated that the nut holder 10 is positively retained against removal from attached position and is held against relative rotation by the side walls 22 of the nut holder in positive abutting relation with the ends of the molding flanges 3 in a manner whereby the bolts B may be fully tightened without need for holding the nuts N against turning with the bolt as it is tightened.

Fig. 4 shows the invention as provided in a holder or retainer for a bolt B' having a relatively large head 30 defining a wide clamping surface for heavy duty applications, as aforesaid. The holder 10 is of the same construction as that shown in Figs. 1 and 2 and said bolt B' is assembled therewith as shown in Fig. 4 such that the device is adapted to be attached to a molding or channel shape in substantially the procedure described with reference to Fig. 3. The required number of such bolts B' are attached, likewise, in spaced relation lengthwise of the molding or channel shape M with the shanks 31 of said bolts B' projecting through the slot 1 in the molding or channel shape M in position to pass through correspondingly spaced passages in a part to be secured to said molding or channel shape M by cooperating nuts applied to the projecting ends of said bolts B'.

While the invention has been described in detail with a specific example, such example is intended as an illustration only inasmuch as the invention fully contemplates various modifications which may be provided without departing from the spirit and scope of the invention.

What is claimed is:

1. A sheet metal retainer for a nut or bolt head comprising a piece of sheet metal bent intermediately to provide a generally channel-shaped formation comprising a bridge portion having spaced walls extending integrally therefrom in substantially normal relation thereto, base portions integral and continuous with the ends of said walls and extending outwardly therefrom in opposite directions, said base portions being adapted to bear against one surface of a support at opposite sides of a slot in said support and said channel-shaped formation being receivable in said slot with said spaced walls thereof in abutting relation to opposite edges of said slot to prevent relative turning of said retainer in attached position on said support, said channel-shaped formation being provided with a bolt passage in said bridge portion thereof and carrying a pair of substantially rigid tongues extending outwardly in opposite directions in overlying spaced relation to said base portions for engaging marginal portions of said slot at the opposite surface of said support, a pair of arms extending from the ends of said base portions in the direction opposite to said channel-shaped formation, a threaded element positioned adjacent said base portions, means on said arms limiting axial movement of said threaded element, and means on said base portions limiting rotation of said threaded element with the thread means thereof aligned with said passage in said bridge portion.

2. A sheet metal retainer for a nut or bolt head comprising a piece of sheet metal bent intermediately to provide a generally channel-shaped formation comprising a bridge portion having spaced walls extending integrally therefrom in substantially normal relation thereto, base portions integral and continuous with the ends of said walls and extending outwardly therefrom in opposite directions, said base portions being adapted to bear against one surface of a support at opposite sides of a slot in said support and said channel-shaped formation being receivable in said slot with said spaced walls thereof in abutting relation to opposite edges of said slot to prevent relative turning of said retainer in attached position on said support, said channel-shaped formation being provided with a bolt passage in said bridge portion thereof and said spaced walls thereof having partially severed areas providing a pair of substantially rigid tongues having integral junctions with said bridge portion and free ends extending outwardly in opposite directions in overlying spaced relation to said base portions for engaging marginal portions of said slot at the opposite surface of said support, a pair of arms extending from the ends of said base portions in the direction opposite to said channel-shaped formation, a threaded element positioned adjacent said base portions, means on said arms limiting axial movement of said threaded element, and means on said base portions limiting rotation of said threaded element with the thread means thereof aligned with said passage in said bridge portion.

References Cited in the file of this patent

UNITED STATES PATENTS

| 1,732,992 | Spiro | Oct. 22, 1929 |
| 1,732,993 | Spiro | Oct. 22, 1929 |
| 2,078,411 | Richardson | Apr. 27, 1937 |
| 2,303,148 | Tinnerman | Nov. 24, 1942 |
| 2,605,806 | Tinnerman | Aug. 5, 1952 |